Patented Oct. 6, 1953

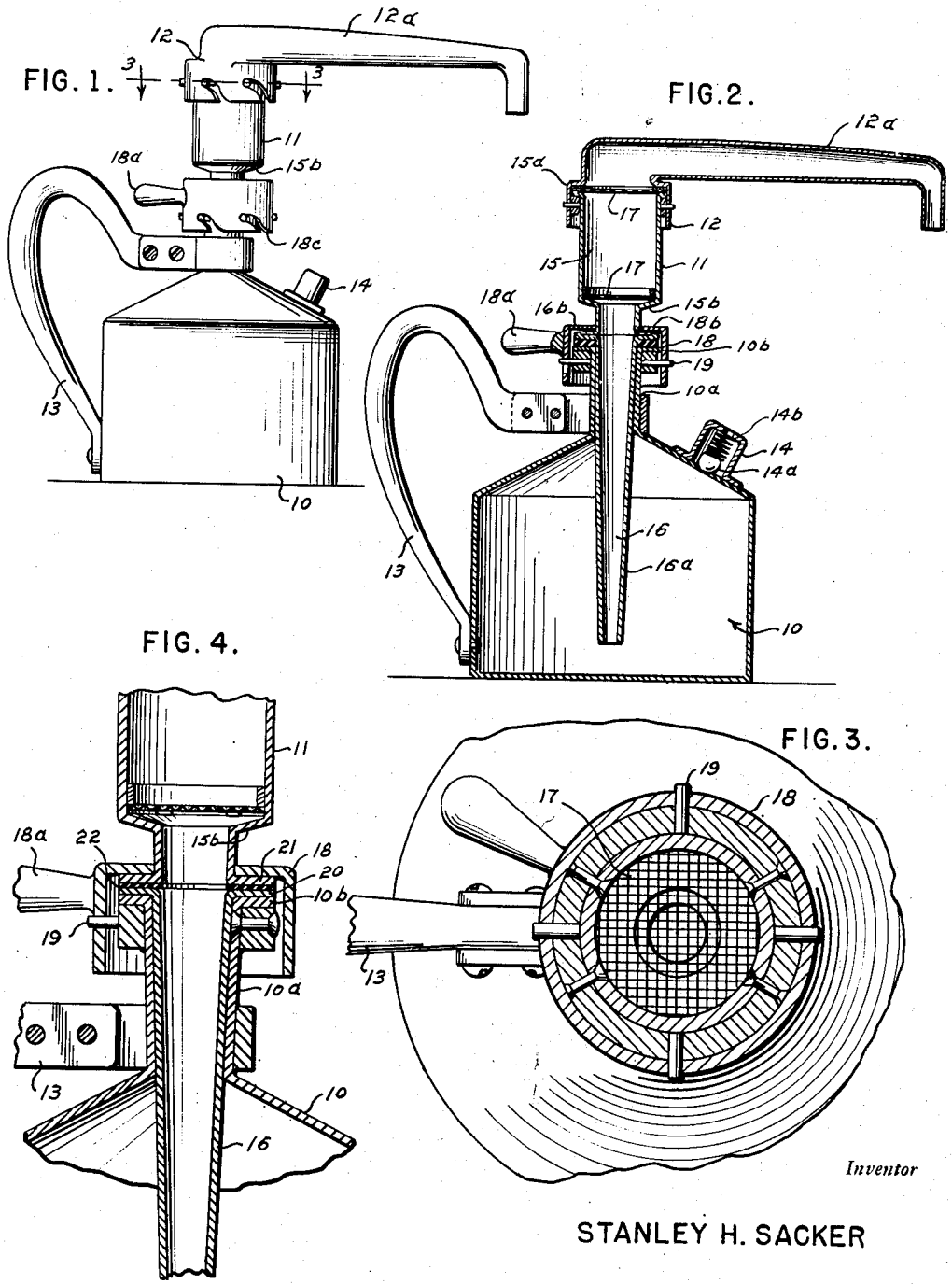

2,654,306

UNITED STATES PATENT OFFICE 2,654,306

HOME COFFEE BREWING APPARATUS

Stanley H. Sacker, New Orleans, La.

Application March 14, 1949, Serial No. 81,249

2 Claims. (Cl. 99—303)

This invention relates to improvements in home coffee brewing apparatus, and has particular relation to devices of this type designed to permit the brewing of coffee under small quantity conditions, as for instance amounts for two, four or six cups.

The present invention is designed to permit the user to prepare the small quantity of the beverage desired by brewing it from the ground coffee itself, thus enabling the user to secure his favorite brand of beverage at will, thus not only obtaining the desired flavor, but doing so under conditions where the brew is of superior quality and type.

A prevailing method of brewing coffee, as used in restaurants and the like, is that which employs a pair of vessels connected in such manner that water can be heated in one vessel, then caused to traverse the coffee charge by seepage therethrough under pressure, after which the brew is returned to the first receptacle. In the present commercial variety or "vacullator" types, the water does not pass through the coffee grounds under pressure, but permeates the grounds by reason of capillary attraction, or just plain wetting. These assemblies are designed to produce a considerable quantity, twenty cups or more, for instance, the brewed coffee then being served from the container as desired. This requires continued heating of the coffee after brewing, and hence the brewed coffee is subject to deterioration if not dispensed within a reasonable time. The latter condition is especially true where the prevailing apparatus returns the brewed coffee through the grounds, thus repeating the brewing action the second time, and tending to release the tannin content which the initial brewing had not released.

In an earlier application, filed March 3, 1947, Serial No. 731,895, now Patent No. 2,464,722, bearing on apparatus of such latter type, the process limited the brewing to a single passage of the water, thus eliminating this tannin deterioration effect, but such process deals primarily with the large quantity production, although it is capable of use for producing small quantities with the apparatus through leaving some of the elements thereof inactive during the process. The prior apparatus is capable of usage under either condition, but it is preferably used under the larger quantity conditions, with the smaller quantity use confined more particularly to emergency conditions. The present invention uses a similar brewing process, but omits features designed more particularly for the quantity production service.

Due to the fact that the number of cups to be brewed is relatively small in number, the dimensions of the present assemblage are greatly reduced over those required for quantity production, the service unit occupying but small space, being capable of location at any point capable of providing the heating requirements. This permits the production of an assemblage at comparatively low cost, operative under high efficiency conditions, easily serviced, and particularly adapted for home service conditions.

To these and other ends, therefore, the nature of which will be better understood as the invention is hereinafter disclosed, said invention consists in the improved construction and combinations of parts more particularly described in detail hereinafter, illustrated in the accompanying drawings, and more particularly pointed out in the appended claims.

In the accompanying drawings, in which similar reference characters indicate similar parts in each of the views, Figure 1 is a view in side elevation of the invention with the parts in position for coffee brewing.

Fig. 2 is a vertical section of the same.

Fig. 3 is a sectional view taken on line 3—3 of Fig. 1.

Fig. 4 is a detail sectional view of an intermediate zone and showing a modified arrangement.

The specific embodiment of the invention disclosed herein is formed of a water containing heating unit 10, a coffee charge carrying unit 11 and the discharging element 12. These are operatively related during the brewing serivce, but separable for assembling the invention for the brewing service and for cleaning the various units. In use, the unit 10 is adapted to receive the water content to be used during the brewing procedure after which the unit formed of the coffee charge carrier 11 and its depending tube 16 together with the discharging element 12 are positioned in the open top of the unit 10, the coffee charge being, of course, properly positioned within the container or carrier 11. The tube 16 thus extends into proximity to the bottom of the unit 10, but spaced therefrom and the assemblage is then positioned on a heating source. When thus positioned, the brewing development partially follows that provided under quantity production conditions, in that as the water approaches the boiling temperature, pressure developed within the heater above the water surface, which pressure when sufficient to overcome the resistance provided by the charge and filters, forces water to rise in the depending tube, enter and traverses the coffee charge, and is discharged into the dispensing element from the top of the carrier, the dispensing element discharging the brewed coffee external of the assemblage. The water thus passes through the charge in but one direction, upwardly, and completes its passage through the carrier within a period which will release the desired components of the charge, but insufficient to release the undesired components (such as tannin, for instance) which require a longer period of contact for the release. Since the brewed coffee is then discharged from the assemblage without further contacting the charge, the brew is kept free from the undesired tannin and other effects, and is discharged in its most favorable condition.

The specific brewing process thus follows the practice used under quantity production conditions, especially the process used with the earlier invention above identified, differing therefrom in that the brew is not returned to the water heater, the latter thus serving only as the receptacle within which the water is initially heated and in which the pressures for producing the water movement through the coffee-charge are produced. Since it is not being used as a storage chamber for the brewed coffee, its dimensions may be materially reduced and may be designed for the brewing of small quantities, two, four or six cups, for instance, during an operation. In practice, the water heating container 10 may be given a desired shape, that shown in the drawings, for instance, in which the body is cylindrical and fashioned with a conical top which terminates in a neck zone 10a, the top of which is formed with an open mouth having an outturned flange 10b. A suitable handle 13 is secured to the container 10, and for reasons presently explained, the container is also provided with a pressure relief valve assembly 14.

The coffee-charge carrier 15 is a receptacle of generally uniform diameter having an open top with an outwardly extending flange 15a, the bottom zone being preferably formed with an inturned flange 15b of suitable shape and which forms the upper end of the water delivery tube assembly 16, which may be in the form of a tubular member formed integral with the flange zone 15b or formed separately therefrom and coupled thereto as presently described. The receptacle 15 is arranged to carry a pair of filter screens 17, one at the top and one in the bottom zones, with both removably positioned, the coffee-charge being located between such screens.

The water delivery assembly is formed of a tubular member 16a which may be formed integral with the flanged zone 15b, or formed separately therefrom. If formed integral, an intermediate zone is provided with a flanged portion 16b projecting outwardly for association with a locking assembly, presently described, by which the assembly is secured in position on the heater 10 with the tube 16a extending through the neck of the heater 10. If the tube 16a is formed separately (Fig. 4), its upper end is formed with an outwardly extending flange 20 and the flange 15b provided with a flange 21 similar to the tube flange, the assembly being completed by a gasket 22 between the two flanges to form a tight joint, with the parts held in position by the locking assembly referred to.

In practice, the length of tube 16a is such that when the assemblage is completed with the tube locked in position, the lower open end of the tube will be spaced a small distance above the bottom of heater 10 as shown. This assures that during the water delivery for brewing, the entire volume of water will not be discharged from the heater. As is the case with structures of this type, heating of the water content will serve to produce a pressure within the heater above the water level, and when its value becomes sufficiently high, it will force water content to rise within the tube under pressure, through the lower filter into the receptacle 15 for action on the coffee charge and onward through the upper filter in the form of the brewed coffee. Pressure conditions are maintained by the continued heating of the water residue, so that as long as the water level is above the plane of the lower end of tube 16a, the pressure will continue to drive the water into and through the tube until the water level falls sufficiently as to expose the lower end of the tube above the level, at which time the pressure within the heater has direct access to the interior of the tube and acts to continue to force the previously entered water upward through the assemblage. The residue of water below the level of the tube enables the development of the needed pressure to continue until the previously delivered water has been passed through the assemblage, whereupon the heater is taken from its heating station.

The pressure relief valve assembly 14 is provided to control the operating pressures within the heater. It is in the form of a valve member such as a ball 14a cooperating with a valve seat, with the ball supported by a spring 14b. When the pressure within the heater exceeds the spring resistance, the ball will unseat to reduce the pressure. Such pressure regulating structures are unneeded under quantity production practice, since the amount of water used is large and its heating is at a comparatively slow rate so that the attendant can readily control the conditions by simply removing the container. With the present invention, however, where the amount of water is relatively small, the heating is more rapid and it would be somewhat difficult for the attendant to control with accuracy. With the assembly 14 in service, however, the pressure cannot exceed the desired value.

The tube 16a and the parts of the assemblage thereabove, are secured to the heater 10 in the following manner: 18 indicates an annular member, having a handle 18a, said member having an inturned flange 18b at its top, with the flange adapted to encircle the tubular assembly above the flanged zone therein, above the projecting flange of the unitary structure, or the flange zone of the separate assembly. The side wall of the member is formed with a plurality of key-way recesses 18c extending from its lower edge, these recesses being adapted to receive a corresponding number of pins 19 carried by the neck zone of the heater 10. When the parts are being assembled, the tube 16a is passed into the heater through the neck zone of the latter until the flanged zone of the tube contacts with the neck flange, preferably with a gasket therebetween. This places the pins 19 in position to enter the recesses 18c and be moved therein by rotation of the member 18, thus clamping the tube tightly to the neck of the heater 10 and preventing pressure leakage through the connection.

The dispensing element 12 is a tubular structure shaped substantially as shown, its inner end being formed to overlie the upper flange end of receptacle 15 and above the upper filter 17, the structure being similar in type to that of the locking structure with the pins carried by the container 15 and the recesses carried by an integral portion of the inner end of the discharging element instead of separately. The element has a tubular portion 12a extending laterally for a distance sufficient to extend beyond the assemblage with the end of the portion down-turned as shown. The structure can thus be readily assembled on to the top of the container 15 above the upper filter and after the coffee charge has been located in the assembly, the portion 12a forming a convenient handle to rotate the element to tighten it to its seat.

As will be understood, the use of the locking devices, with their gasket formations present, causes the assemblage to be rendered exceedingly stable and pressure-sealed during the brewing preparation and development. In addition, the leak-proof conditions set up assure the development and maintenance of the needed pressures within the heater 10 and within the water travel path to and through the brewing receptacle 15. While such service efficiency is provided, the locking devices are such as to provide ready and simple operations in dismantling the assemblage after the brewing service for cleansing and other purposes.

As previously pointed out, the assemblage is designed to meet particular conditions, being somewhat in the nature of an assemblage for "home" use, situations which require the production of a few cups of coffee at minimum expense and yet have the brew fresh and made from a personally selected blend of coffee berries brewed under the most favorable conditions to produce palatability, such as is secured by restaurants etc., under quantity condition activities. Coffee-charge packages designed for the brewing of a limited quantity are now obtainable commercially, making it possible to provide the brew of maximum palatability at materially lower costs, since there is neither an excessive amount being brewed nor the need of keeping a brewed oversupply heated and gradually deteriorating, the brew is always fresh.

In practice, the dimensions of the assemblage are based on the number of cups designed to constitute the single brew, two, four, or six cups, being illustrative. The container 10 receives the necessary amount of water which will be required for the operation, the packet placed in the charge receiver, and the assemblage then completed and placed on the heating appliance. When the temperature approaches the boiling point, the pressure within the heater will force the content to rise in tube 16a through the lower filter into proper contact with the coffee charge to produce the brewing, the brew then passing through the upper filter and into the dispensing tube for discharge, the entire movement being under the pressure within the container 10. The pressure relief assembly 14 will prevent overpressure, so that assurance is had that a brewing increment will remain in contact with the charge for a time-length sufficient to secure the desired release of the desired coffee components, but insufficient to permit release of the undesired tannin and the like. Since the pressure is controlled, the heating is continued until the water advancing through the assembly has been delivered in brew form. The brew can be received in a single vessel, or a succession of cups may be positioned to receive the total.

As will be understood, an assemblage dimensioned for brewing say six cups may be employed for brewing a lesser quantity by the use of the smaller packet of coffee charge, and by decreasing the amount of water initially placed in the container 10. In practice, the latter amount is that required to supply the residue, the amount remaining when the level is lowered sufficient to expose the lower open end of the tube 16a, together with the amount of a slight excess over the number of cups desired. As will be apparent, an assemblage of this type designed for home service conditions, must not only provide for a proper brewing cycle action during actual service, but the assemblage must be so formed as to be an efficient assemblage under the general characteristics of home service conditions. For instance, the assemblage is obviously used intermittently, at meal-time, for example, or on special occasions, thus being in contrast with the service conditions in restaurants or the like where assemblages of this type are generally employed and where the need for a continuing supply of the beverage forms the basis for the use of this special type of brewing procedure. Under such conditions of intermittent use, the relatively small number of cups of beverage actually used during the brief period of individual service tends to prevent the use of the practice owing to the possibility of excessive cost and wastage, but the greater deterrent is due to the fact that the assemblage should be carefully and thoroughly cleansed after each period of service in order that the succeeding brew will not present any contaminating effect from the presence of the dregs or residue of previous brewings. Coffee purveyors can supply the desired charge volumes to restrict wastage to the minimum, but a contaminated brew due to improper cleansing must be avoided if the desired results are to be secured. Hence, the assemblage must not only be capable of providing a perfect brew, but must be of such form as will permit of the needed thorough cleansing after each period of use.

The present assemblage is especially formed to meet these conditions by forming the beverage developing and delivery path sectional in type with the sections so arranged that the coffee charge section is completely individual and adapted for ready and rapid positioning and removal to and from the path at will with the connections of the quick-detachment type such that when completed, the path through the assemblage will be solely through the coffee charge section and properly equipped for efficient action when the assemblage is in service, and can be quickly released for cleansing purposes at the close of the service.

In practice, the inactive assemblage may or may not be maintained in its set up condition between periods of use. If assembled, the path is first separated to permit access to the receptacle for the addition of the needed amount of water. The desired quantity of coffee charge is then positioned within the coffee charge section and the latter attached to the receptacle, and the upper filter positioned, after which the delivery section is then added to the top of the coffee charge section, thus preparing the assemblage for the brewing activity by placing the assemblage in position for heating the water content of the receptacle. When the period of service has ended, the delivery section is first removed, thus releasing the upper filter, which is first removed, and the coffee-charge section which is then removed bodily as a unit with its dreg-content intact, enabling the section to be readily emptied and cleansed. With the delivery section and the receptacle section also cleansed, the assemblage can be quickly re-assembled for inactivity with assurance of the desired cleanliness of the parts when the succeeding period of service is due.

It will be understood, the assemblage is such that the portion of the path most vulnerable to contaminating action is that of the coffee charge section in which the actual brewing takes place. By forming this section completely individual, it not only provides for ease in charging the section but has the greater advantage of confining the dregs to the single unitary structure which is of such form as to be capable of quick emptying and complete cleansing to assure that no undesired after effects remain such as could affect a succeeding brew.

While I have herein shown and described a preferred form and arrangement of assemblage for practicing the invention, it will be understood that changes and/or modifications thereof may be found desirable or essential in meeting the exigencies of service, or the desires of an individual user. I, therefore, reserve the right to make any and all such changes and/or modifications as may be found so desirable or essential insofar as they may fall within the spirit and scope of the invention as expressed in the accompanying claims, when broadly construed.

What is claimed as new is:

1. A joint for connecting the tubular ends of a coffee pot assembly having a water heating base element, a coffee holding intermediate element and an upper discharge element, said elements having co-acting tubular ends, each of said joints including a circumferential flange on the upper end of each lower tubular portion, a circumferential flange co-acting with the first mentioned flange and located on the lower portion of a respective upper tubular portion, a gasket interposed between said flanges, a reinforcing ring surrounding the upper ends of each tubular portion below and supporting the flange thereon, pins extending radially in opposite diametrical relation from said reinforcing ring, a locking sleeve on the lower end of each respective tubular portion and provided with a series of arcuate slots extending from the lower edge of the locking sleeve upwardly and around said sleeve, said slots being uniformly spaced around the sleeve.

2. The joint arrangement of claim 1 having a perforated disc secured between the flanges on the intermediate and upper tubular portions.

STANLEY H. SACKER.

References Cited in the file of this patent

UNITED STATES PATENTS

| Number | Name | Date |
|---|---|---|
| Re. 22,022 | Peters | Feb. 10, 1942 |
| 19,780 | Ingraham | Mar. 30, 1858 |
| 269,028 | Deparquet et al. | Dec. 12, 1882 |
| 555,500 | Denk | Mar. 3, 1896 |
| 959,110 | Buck | May 24, 1910 |
| 1,168,988 | Zimmermann | Jan. 18, 1916 |
| 1,762,303 | McBride | June 10, 1930 |
| 2,464,722 | Sacker | Mar. 15, 1949 |

FOREIGN PATENTS

| Number | Country | Date |
|---|---|---|
| 10,264 | Great Britain | 1913 |
| 219,895 | Switzerland | June 1, 1942 |
| 469,847 | Germany | Dec. 29, 1928 |
| 510,294 | Great Britain | July 31, 1939 |